United States Patent [19]

Weiss

[11] Patent Number: 5,404,958

[45] Date of Patent: Apr. 11, 1995

[54] LIFTING STRUCTURE FOR AN AGRICULTURAL TRACTOR

[75] Inventor: Heinz Weiss, Bensheim, Germany

[73] Assignee: Deere & Company, Moline, Ill.

[21] Appl. No.: 139,965

[22] Filed: Oct. 20, 1993

[30] Foreign Application Priority Data

Oct. 23, 1992 [DE] Germany .......... 42 35 797.7

[51] Int. Cl.6 .......................................... A01B 59/042
[52] U.S. Cl. .................................. 172/439; 414/914;
172/272; 172/677; 172/675; 172/680-; 280/709;
280/474
[58] Field of Search ................ 172/677, 679, 680, 47,
172/272, 467, 439, 669, 448, 675, 776; 280/432,
455.1, 474, 689, 709; 414/914, 609, 631;
187/222, 223; 37/231, 234; 56/14.7

[56] References Cited

U.S. PATENT DOCUMENTS

| | | | |
|---|---|---|---|
| 3,066,818 | 12/1962 | Simpson | 187/222 |
| 4,174,854 | 11/1979 | Spicka et al. | 280/709 |
| 4,186,811 | 2/1980 | Bidon | 172/439 |
| 4,423,886 | 1/1984 | Taylor | 172/439 |
| 4,424,870 | 1/1984 | Weiss | 172/439 |

FOREIGN PATENT DOCUMENTS

| | | |
|---|---|---|
| 2804129 | 8/1978 | Germany . |
| 2807299 | 8/1979 | Germany . |
| 3107228 | 9/1992 | Germany . |

*Primary Examiner*—Randolph A. Reese
*Assistant Examiner*—Spencer Warnick

[57] ABSTRACT

An agricultural tractor includes an axle body and a vehicle substructure. A generally vertical lifting structure is rigidly attached to the vehicle substructure and engages a lifting frame which is adjustable in height. The lifting frame carries coupling and/or drive arrangements for implements. A hydraulic cylinder is arranged between the lifting frame and the axle body. The cylinder is connected to a hydro-pneumatic pressure reservoir and functions as an elastic spring support. A lock can be engaged to fix the lifting structure rigidly to the axle body. A transport lock can be selectively engaged to rigidly connect the lifting structure to the lifting frame. A selector valve selective connects the pressure chamber of the hydraulic cylinder with either a hydro-pneumatic pressure reservoir or with a lifting control arrangement. Preferably the lifting structure is designed as a rollover structure.

5 Claims, 3 Drawing Sheets

LIFTING STRUCTURE FOR AN AGRICULTURAL TRACTOR

BACKGROUND OF THE INVENTION

The invention relates to an agricultural tractor, and more particularly, to a lifting structure which is attached thereto.

DE-A-28 04 129 shows an agricultural tractor, configured as a straddle tractor, wherein a chassis is supported through front and rear stilts on the front and rear wheels. The chassis carries a lifting arrangement that consists of a first frame, with vertical side pieces configured as rails, and a second frame, arranged to slide in the rails. The second frame carries a three-point hitch for implements, whose operating height can be controlled by two actuating cylinders arranged symmetrically between the first and the second frame. In any case, an operator-friendly adjusting capability for the three-point hitch is attained at a considerable construction cost.

A multi-purpose agricultural vehicle is also known from DE-C-28 07 299, whose vehicle superstructure is supported through leaf springs on an axle body which carries the rear wheels. In the vicinity of the leaf springs a pressurized fluid cylinder is connected in joints between the axle body and the superstructure whose pressure chamber can be connected through a shut-off valve to a hydro-pneumatic reservoir, acting as supplementary spring. Arrangements for the attachment of implements are not described in this document.

DE-A-31 07 228 describes a far-reaching standardization of the implement coupling, such as trailer attachments adjustable for height, low attachments for single-axle trailers with rigid or automatic coupling, three-point attachments, drawbars etc. In each such system consideration is given to the power-take-off drive and electric and hydraulic quick-coupling devices. By the use of an electronic lifting control the agricultural tractor with attached implement can be operated above 8 km./hour as an active system with dynamic vibration damping of the implement mass, and below 8 km./hour with drawbar pull regulation. However, the problem is that single-axle trailers generate a comparable vibratory excitation without being able to apply the electronic lifting control to their reduction, since the single-axle trailer is coupled to the trailer coupling arrangement and not to the three-point hydraulic hitch.

In connection with agricultural tractors, recent efforts have been directed at reducing the various coupling arrangements to their basic functions: carrying, pulling, driving, steering etc. and to standardize these functions. Efforts have also been directed at attaching ever larger and heavier implements to the tractor and simultaneously increasing the operating speeds so as to raise productivity.

SUMMARY OF THE INVENTION

Accordingly, an object of this invention is to improve the dynamic behavior of tractor-implement functions.

A further object of the invention is to further advance the standardization of the interfaces between an agricultural tractor and the implements connected thereto, and to satisfy the varying requirements with a simple system.

Another object of the invention is to provide a simple vehicle-implement interface which is adjustable in height and which provides elastic spring support of the axle at slight additional cost.

These and other objects are achieved by the present invention, wherein an agricultural tractor includes an axle body and a vehicle substructure. A generally vertical lifting structure is rigidly attached to the vehicle substructure and engages a lifting frame which is adjustable in height. The lifting frame carries coupling and/or drive arrangements for implements. A hydraulic cylinder is arranged between the lifting frame and the axle body. The cylinder is connected to a hydro-pneumatic pressure reservoir and functions as an elastic spring support. A lock can be engaged to fix the lifting structure rigidly to the axle body. A transport lock can be selectively engaged to rigidly connect the lifting structure to the lifting frame. A selector valve selective connects the pressure chamber of the hydraulic cylinder with either a hydro-pneumatic pressure reservoir or with a lifting control arrangement. Preferably the lifting structure is designed as a rollover structure.

DETAILED DESCRIPTION

Figure 1:
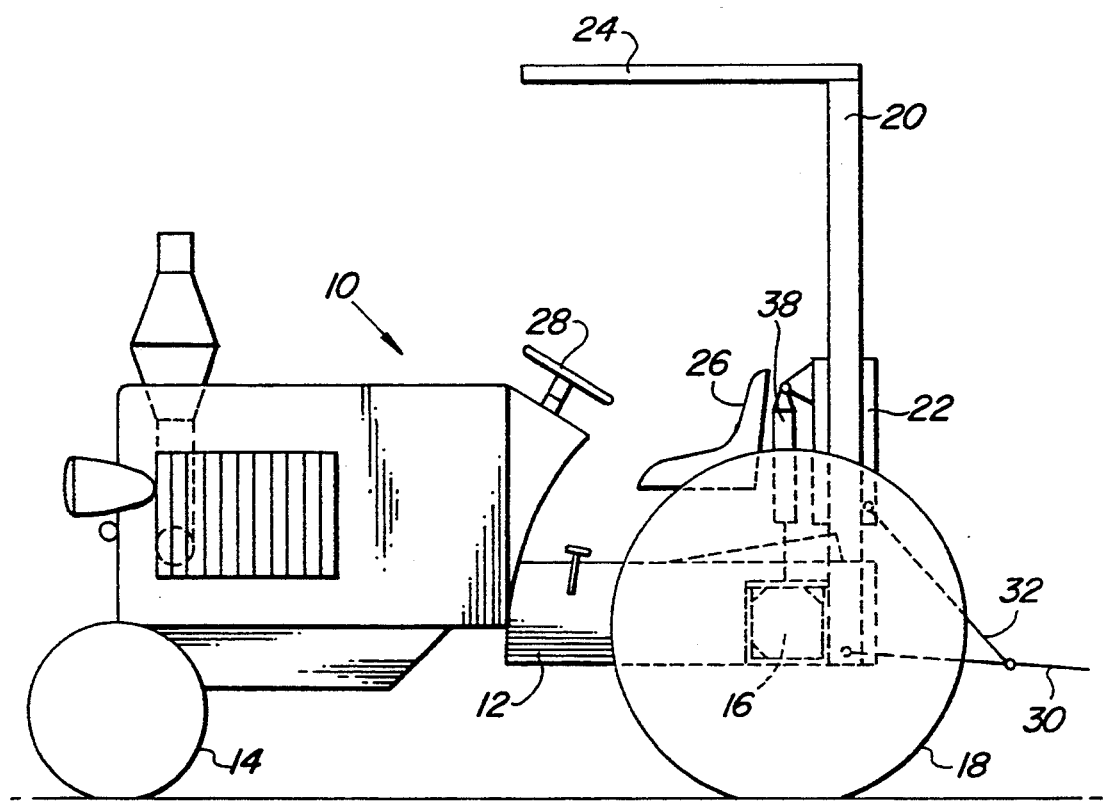
FIG. 1 is a schematic side view of an agricultural tractor, according to the invention, with rear-mounted lifting structure and lifting frame.

The agricultural tractor 10 shown in FIG. 1 is equipped with a tractor chassis 12 that carries a full-floating front axle in its forward region with front wheels 14. The tractor chassis 12 is preferably elastically supported in known manner by spring struts (not shown) or by a hydro-pneumatic spring system (not shown) on the front axle 14.

In the rear region of the tractor chassis 12 a rear axle 16 is arranged with rear wheels 18. The rear axle 16 is not rigidly fixed with respect to the tractor chassis 12, particularly in the vertical direction.

A general vertically upward extending lifting structure 20 is rigidly attached to the rear of the tractor chassis 12. The lifting structure 20 includes two U-section rails, whose upper ends are connected to each other by a transverse carrier, not detailed further. A vertically movable lifting frame 22 is guided in the U-section rails.

A cab roof 24 is carried by the upper end of the lifting structure 20. In addition, vertical cab sides (not shown) may be provided which can form a closed vehicle cab that encloses the operator's seat 26 and a control console with steering wheel 28. The lifting structure 20 is preferably designed to be so strong and is rigidly fastened to the tractor chassis 12 so that it can function simultaneously as a rollover structure in addition to its function as guide for the lifting frame 22. This configuration saves the expense of providing a separate rollover protection structure or a correspondingly rigid design of the vehicle cab so as to meet the safety requirements.

Two lower steering arms 30 are attached at joints to the sides of the tractor chassis 12. The central regions of the lower steering arms 30 are each connected by a lifting rod 32 to the vertically adjustable lifting frame 22, so that the free, rear ends of the lower steering arms 30 can be raised or lowered. The lifting frame 22 may be provided with further mechanical, electrical or hydraulic couplings for the attachment of implements or trailers, such as is described in DE-A-31 07 228.

At least one operating lock 34 is provided between the tractor chassis 12 and the lifting structure 20 so that the lifting structure 20 can be rigidly connected to the tractor chassis 12. Furthermore, at least one transport lock 36 is provided between the lifting structure 20 and the lifting frame 22 so that the lifting frame 22 can be rigidly connected to the lifting structure 20. The operating lock 34 and the transport lock 36 should permit easy and rapid engagement.

Preferably, electric or hydraulic power assistance (not shown) may be used for the automatic engagement and disengagement of the locks 34, 36 controlled from the operator's cab. The locks 34, 36 can be configured, for example, as sets of gear teeth (not shown) mounted opposite each other, each fastened to one of the parts to be connected, in the form of racks, that can be brought into engagement with each other.

Preferably, a pair of hydraulic cylinders 38 are arranged between the rear axle 16 and the upper region of the lifting frame 22, one on each side of the vehicle. The piston rod 40 of the hydraulic cylinder 38 is coupled to the rear axle 16 and the upper end 42 of the cylinder housing is coupled to a mount 44 fastened to the lifting frame 22.

The pressure chamber 46 of the hydraulic cylinder 38 is connected through a hydraulic line 48 with an electromagnetically controlled selector valve 50. Valve 50 connects the hydraulic line 48 to either a hydro-pneumatic pressure reservoir 52 or to a port 54 of an electromagnetically controlled control valve 56. Preferably, the selector valve 50 is a three-way, two position valve, and the control valve 56 is a three-way, three-position valve. The control valve 56 permits the port 54 to be hydraulically blocked or to be connected to a hydraulic pump 58 or a reservoir 60. The suction chamber 64, located under the piston 62 of the hydraulic cylinder 38, is connected via an adjustable throttling restriction 66 to the reservoir 60.

Figure 2:
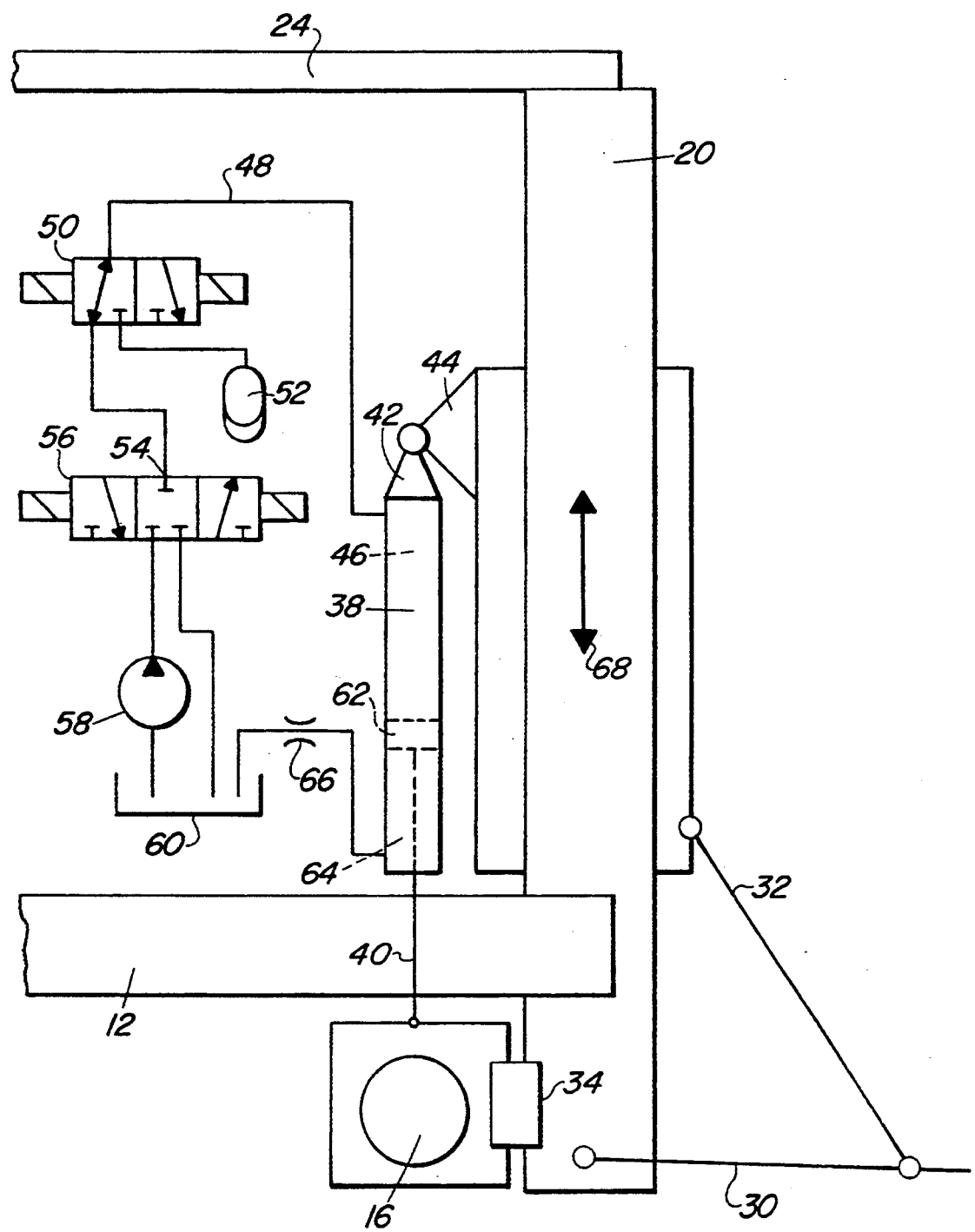
FIG. 2 is a schematic side view of the arrangement according to the invention in its operating position.
Figure 3:
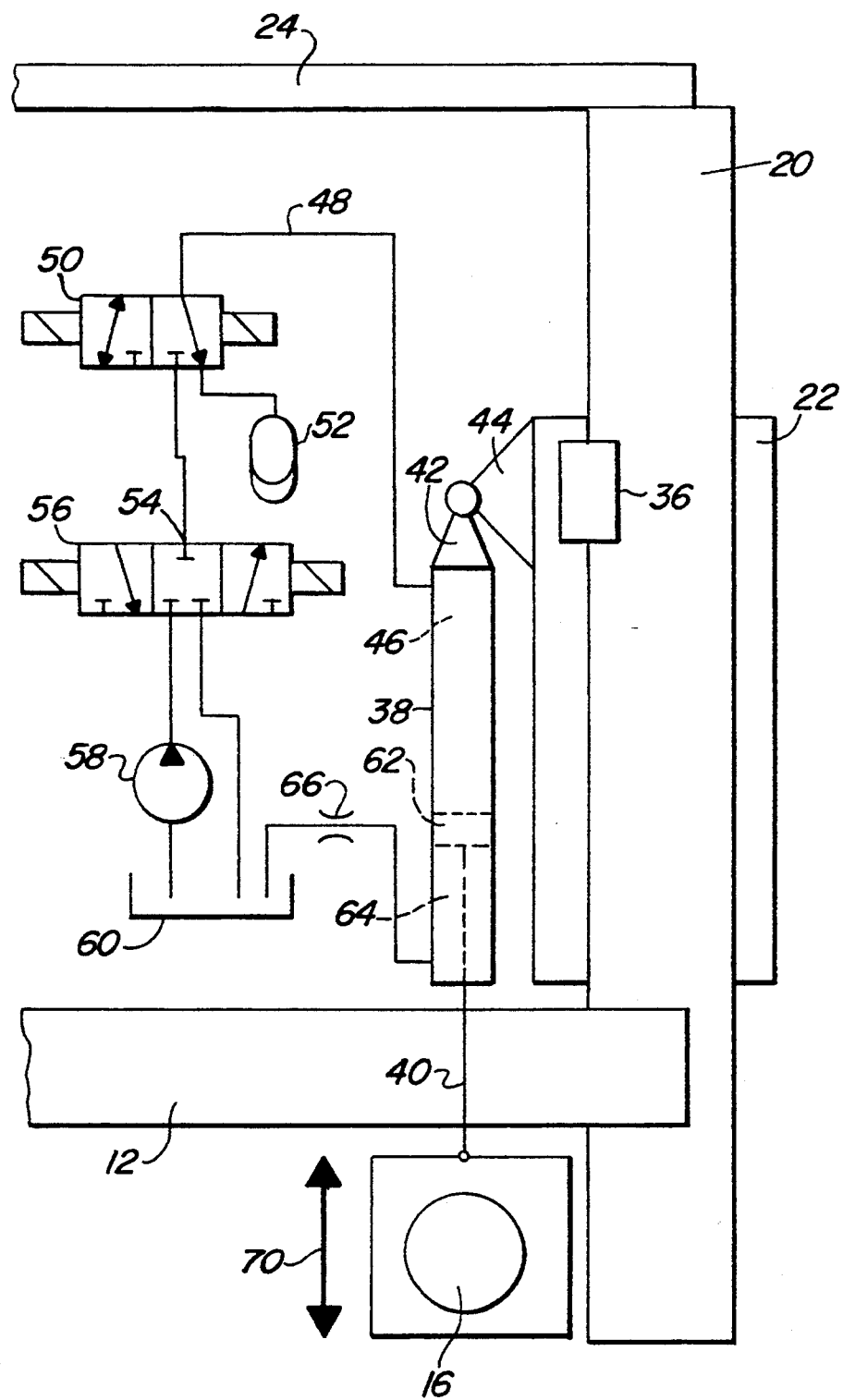
FIG. 3 is a side view of the arrangement according to FIG. 2 in its transport position.

The operation of the arrangement shown in FIGS. 2 and 3 is as follows:

To perform operations in the field, the elastic spring support of the vehicle is to be suppressed, and an automatic height adjustment of the implement attached to the lower steering arms is to be maintained. This mode of operation is made possible, as indicated in FIG. 2, by the engagement of the operating lock 34 between the rear axle 16 and the lifting structure 20, so that the rear axle 16 and the lifting structure 20 are rigidly connected to each other. Furthermore, the selector valve 50 is operated so that it connects the hydraulic line 48 with port 54 of the control valve 56. The control valve 56 can be controlled by a lifting control arrangement as has become known, for example, from EP-A-0 428 076, in order to raise or lower the hydraulic pressure in the pressure chamber 46 of the hydraulic cylinder 38 to correspond to the desired height of the attached implement (not shown). A change in the pressure in the pressure chamber 46 produces a movement of the lifting frame 22 relative to the lifting structure 20 in the direction of the double arrow 68.

During transport operation, particularly at higher speeds, it is desirable that the operator's cab be supported on the rear axle with an elastic spring support. This mode of operation is made possible by disengaging the operating lock 34 and engaging the transport lock 36. Simultaneously, the selector valve 50 is brought into the position shown in FIG. 3, in which the pressure chamber 46 of the hydraulic cylinder 38 is connected through the hydraulic line 48 to the hydro-pneumatic pressure reservoir 52. Now the hydraulic cylinder 38 in connection with the pressure reservoir 52 is utilized as a spring component, inserted between the rear axle 16 and the lifting frame 22 which is rigidly connected to the lifting structure 20 and thereby also to the tractor chassis 12. During spring deflection the position of the rear axle 16 relative to the tractor chassis 12 moves in the direction of the double arrow 70. The throttling restriction 66 is used to adjust the vibration damping.

If an interface according to DE-A-31 07 228 is present, a hydro-pneumatic rear axle spring suspension can be attained at a slight additional cost, by locking the lifting structure 20, which is rigidly connected to the vehicle substructure 12, to the lifting frame 22 for transport operations. Simultaneously, the lifting frame 22 is supported elastically through the hydraulic cylinder 38 on the axle body 16, thereby providing hydro-pneumatic spring support of the axle.

On the other hand, during operation on the field, the rear axle 16 is rigidly connected to the lifting structure 20, in order to avoid relative movement between the lifting structure 20 and the axle body 16. In this case the lifting frame 22 can be moved up and down by means of the hydraulic cylinder 38.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. In an agricultural tractor having at least one axle body and a vehicle substructure, a generally vertical lifting structure rigidly attached to the vehicle substructure and a lifting frame coupled to the lifting structure, the lifting frame being adjustable in height and carrying coupling and/or drive arrangements for implements, characterized by:

at least one hydraulic cylinder for supporting the lifting frame on the axle body.

2. The invention of claim 1, characterized by:

an operating lock for rigidly connecting the lifting structure to the axle body.

3. The invention of claim 1, characterized by:

a transport lock for rigidly connecting the lifting structure to the lifting frame.

4. The invention of claim 1, wherein:

the lifting structure functions as a rollover protection structure.

5. The invention of claim 1, further comprising:

a controlled source of lifting pressure;
a hydro-pneumatic pressure reservoir; and
a selector valve for selectively connecting a pressure chamber of the hydraulic cylinder with the hydro-pneumatic pressure reservoir or with the controlled source of lifting pressure.

* * * * *